March 25, 1952

P. A. NOXON 2,590,428

ORIENTATION SYSTEM

Filed Sept. 21, 1944

2 SHEETS—SHEET 1

Fig. 1.

Inventor
Paul A. Noxon

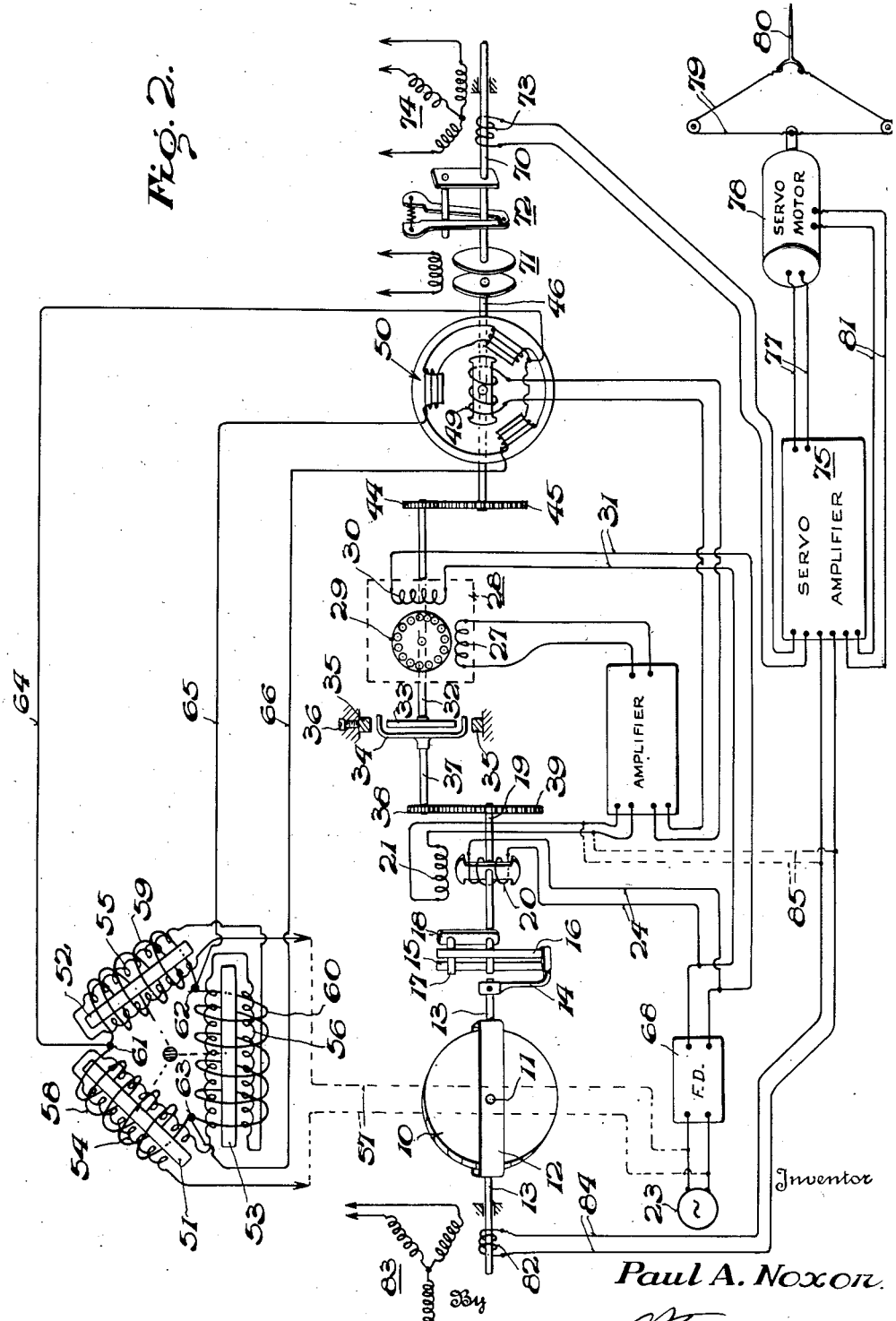

Patented Mar. 25, 1952

2,590,428

UNITED STATES PATENT OFFICE 2,590,428

ORIENTATION SYSTEM

Paul A. Noxon, Tenafly, N. J., assignor to Bendix Aviation Corporation, Teterboro, N. J., a corporation of Delaware Application September 21, 1944, Serial No. 555,155

7 Claims. (Cl. 33—204)

The present invention relates generally to orientation systems which may be used either as heading indicators and/or controls for operating automatic steering systems, and, more particularly, constitutes an improvement over the apparatus of my copending application Serial No. 399,241 filed June 21, 1941, now U. S. Patent No. 2,361,790 issued October 31, 1944, of which the present application constitutes a continuation in part.

Pendulously mounted compasses, whether of the earth inductor type or of the magnetic needle type, are subject to errors during rapid or steep turns so that they are unreliable as position or orientation indicators during such maneuvers. It was proposed in the above-mentioned copending application to combine the compass with a rate gyro, i. e., a two-degree-of-freedom gyroscope, whereby the latter would be predominating during a turn so that an instantaneous indication of heading was available at any instant during the turn. This was accomplished by combining the rate gyro and the compass to operate a single indicator or control through a motor, the two being mutually corrective. Such systems relied upon the measurement of the angle of gyro precession for operating the motor whose speed was proportional to the rate of turn and which constituted a device for integrating a rate of turn function to obtain an amount of turn or angle of turn function.

The above systems, while completely satisfactory for certain purposes, possessed certain disadvantages, principally because the rate gyro and the motor were coupled through inductive transmitter and receiver devices, the transmitter being coupled to the gyro and the receiver being electrically connected to the transmitter and resiliently constrained against motion by means of a calibrated spring. The exact calibration of the constraining spring and the gyro precession restraining springs was both arduous and time consuming and in service the zero position of the gyro was difficult to maintain.

The present invention overcomes these and other disadvantages, such as telemetric errors, by eliminating both the inductive receiver device and the calibrated constraining spring therefor, as well as the gyro precession springs, and the motor is connected with the rate gyro through a suitable connection which, under certain conditions, may include relatively strong tangent law springs. Such an arrangement desirably permits the operation of the motor as a function of the gyro precession torque rather than the angle of precession as heretofore utilized. Stated in another manner the gyro is substantially unrestrained when a turn is initiated so that the gyro precesses about its axis of oscillation thereby developing in an inductive device a signal proportional to the precessive torque, this signal being fed to operate a motor which, in turn, operates through a drag connection on the inductive device to develop thereon a force equal and opposite to the precessive torque. In effect, an unrestrained two degree of freedom gyroscope is provided whose precession during turn is constrained to a rate of turn function by means of an electric motor.

An object of the present invention, therefore, is to provide a novel and improved orientation indicator and/or control system of the type utilizing a rate gyro and a magnetic compass.

Another object of the invention is to provide a novel and improved orientation indicator and/or control system of the type utilizing a rate gyro and a magnetic compass for governing the operation of a motor, wherein motor operation is a function of gyro precessive torque.

A further object is to provide a novel and improved orientation indicator and/or control system of the character described, wherein during straight flight the compass assumes primary control of the indicator and/or control system, while during turns the gyro assumes primary control, the two being so arranged as to be mutually corrective as well.

Another and further object of the invention is to provide a novel gyroscopic rate of turn device for mobile craft wherein the precession of the gyro during turn is constrained to a rate of turn function by means of electrical means.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts in both views, Figure 1 is a diagrammatic illustration of the electrical circuit together with the various component parts comprising the novel system of the present invention; and, Figure 2 is a view similar to Figure 1 showing the present invention applied to an automatic steering system.

Referring now to the drawings for a more detailed description of the present invention, and more particularly to Figure 1 thereof, the novel orientation system is shown as comprising a two-degree-of-freedom gyroscope having a rotor 10 provided with normally horizontal spin axis 11 mounting the rotor within a gimbal frame 12, the latter being provided with trunnions 13 for mounting the gyro on a vehicle for oscillation about a second axis perpendicular to the spin axis. The axis of oscillation is preferably arranged parallel to the ship's fore and aft axis where the system is to be used as an orientation indicator.

In the copending application, calibrated restraining springs were provided at the gyro so that, upon turning of the vehicle carrying the gyro, the springs developed a force restraining gyro precession to a rate of turn function and, thereafter, the integrator motor was energized by a signal determined by the angle of gyro precession. The principal and novel distinction herein over the arrangement of the copending application resides in eliminating the gyro restraining springs entirely and developing a signal proportional to the precessive torque and running the integrator motor as a measure of such torque, the ultimate effect being that the motor and its couplings apply a restraining force on the gyro, which is equal and opposite to the precessive torque so that the angle of gyro precession is substantially equal to the craft's angle of bank and is a true measure of the vehicle's rate of turn about the vertical axis.

To this end, therefore, one of the trunnions 13 has secured thereto a bracket 14 which supports spaced springs 15 and 16. A pin 17 is arranged between the springs and is carried by a lever 18 secured to a shaft 19, the latter being journalled in alignment with trunnions 13. Springs 15 and 16 are preferably tangent law springs such as described and claimed in U. S. Patent No. 2,351,629 issued June 20, 1944. Shaft 19 supports for angular motion therewith a rotor winding 20 which is inductively coupled with a fixed stator winding 21 of an inductive device 22. Rotor winding 20 normally maintains the position shown in Figure 1, i. e., one wherein the electrical axis thereof is normal to the electrical axis of stator winding 21 so that no signal is induced in the stator even though the rotor winding is energized from a source 23 to which it is connected by means of leads 24.

The moment that the gyro precesses about trunnions 13, it displaces through the resilient coupling defined by springs 15 and 16, rotor winding 20 relative to stator winding 21 whereupon a signal is induced in the stator winding and fed by way of conductors 25 to the input of a conventional vacuum tube amplifier 26, the output of which is fed to energize the variable phase 27 of a reversible two phase induction motor 28 having a rotor 29 and a constantly energized winding 30 which connects through leads 31 with the energizing source. It is desirable for high accuracy that a high gain of amplifier 26 be provided since maximum speed of motor 28 is reached on only a small angle of displacement of rotor 20 from its zero or null position.

Rotor 29 of the motor connects by way of a shaft 32 with a permanent magnet 33 of an eddy current drag coupling device having a non-magnetic drag cup 34 surrounding the outer periphery of the magnet and a soft iron flux return member 35, surrounding the drag cup, the return member being adjustable relative to magnet 33 by means of an adjustment screw 36. Motion of member 35 in one direction or another increases or decreases the effective drag coupling, and eliminates the otherwise difficult adjustment of springs 15 and 16.

Drag cup 34 is rotatably mounted by a shaft 37 which carries a pinion 38 at its free end for meshing with a relatively large gear 39, the two defining a suitable gear reduction train, gear 39 being fastened to shaft 19.

Thus the motor in response to a gyro precessive torque is energized to return, through the eddy current coupling, rotor winding 20 relative to stator winding 21 to a point approximately one-half of a degree from its null position so that a signal remains in the stator proportional to the rate of craft turn to operate the motor so long as gyro precession exists. Except for springs 15 and 16 between the gyro rotor and the inductive device, the rotor winding 20 would be returned to its null in which event the motor would become de-energized. The force exerted by the motor through the drag coupling to maintain rotor winding 20 in the desired position is transmitted through pin 17 to one or the other of springs 15 and 16 so that a restraining force is exerted on the gyro equal and opposite to the precession torque thereof so that the gyro angle of precession is substantially equal to the angle of bank and is a true measure of the rate of turn about a vertical axis. In addition to defining a yieldable coupling between the gyro and the rotor winding 20 of inductive device 22, springs 15 and 16 also define a centralizing means for the gyro in that once the precessive torque on the gyro has dropped to zero but the spin axis of the gyro remains in some position other than horizontal, rotor winding 20 will still be displaced and thus continue feeding a signal to the motor until it runs enough to bring the rotor winding to its null when the motor is de-energized and the gyro becomes centralized through pin 17 and the two springs. The motor and its couplings in effect act on the gyro in a manner equivalent to that of the calibrated gyro restraining springs of the aforementioned copending application. The gyro may be used as a visual indicator of the rate of turn and to this end a pointer shaft 40 may be provided having a pointer 41 at one end for motion over a suitable dial 42, the shaft being actuated from the gimbal through a gear system 43.

Where the apparatus above described is applied to use on marine vessels having no angle of bank during turn, the springs 15 and 16 may be eliminated and trunnion 13 may be rigidly coupled to shaft 19. The motor under this condition will respond to precessive torque as before and develop a force proportional to the rate of turn for opposing gyro precession. Where such modification is utilized the pointer 41 and dial 42 may be eliminated.

From the foregoing it will be apparent that the motor operates at a torque-balancing speed proportional to the rate of turn so that its shaft 32 integrates the rate of turn to obtain a total angular displacement corresponding to the amount of turn. In order to utilize this latter function, for indicating purposes, for example, an extension of shaft 32 is provided with a pinion 44 which meshes with a relatively large gear 45, the two defining a gear reduction system, gear 45 being fastened to a shaft 46 which carries a pointer 47 at its free end for motion over an azimuth scale 48 and which also supports a rotor winding 49 thereon for angular motion relative to a stationary three phase stator 50, the latter device being provided for a purpose to presently appear.

Thus, in response to a turn, the gyro precesses whereupon the motor operates to develop a torque equal and opposite to the precession torque of the gyro so that motor speed is proportional to the rate of turn and its shaft integrates the rate to obtain an amount of turn which is indicated by pointer 47. Like all integrating systems, however, the above arrangement will ultimately develop some integration errors so that a reset in accordance with the earth's magnetic field is provided for correcting the position of pointer 47.

The reset mechanism comprises a pendulously mounted earth inductor device, which may be mounted at some point of the craft having a minimum magnetic disturbance, such device comprising three delta arranged core members 51, 52 and 53. Each of the core members is provided with a pair of series-opposed energizing windings 54, 55 and 56 which connect through leads 57 with the supply source. Each core is, moreover, provided with secondary or output windings 58, 59 and 60 which are connected in a delta relation thereby defining three taps 61, 62 and 63 which connect through leads 64, 65 and 66 with the three phase wound stator 50. Inasmuch as the theory and operation of such devices is set forth fully in the copending application, it is believed sufficient to state for present purposes that as each core member is saturated and unsaturated for each cycle of energizing current in the primary windings, the earth's field enters and leaves each core twice per cycle of the fundamental frequency so that signals appear at output taps 61, 62 and 63 having a frequency double the frequency of the energizing current. These signals set up a resultant magnetic field at stator 50 which is normal to the electrical axis of rotor winding 49 when the latter is at a zero or null position. Motion of the inductor device relative to the earth's field changes the signals at the three taps which are connected to the stator whereby the resultant field thereat changes relative to rotor winding 49 and a signal is induced in the winding which is fed by means of leads 67 to the input of amplifier 26 whereby the variable phase 27 of the motor is energized and the motor drives the rotor back to its null position moving pointer 47 relative to scale 48 and the motor is again de-energized. This system is ideal for indicating magnetic heading during straight flight and is described and claimed in U. S. Pat. No. 2,240,680 issued May 6, 1941.

Since, as already mentioned, the frequency of the signal in stator 50 due to the earth induction device is twice the frequency of the energizing current from source 23, a conventional frequency doubler 68 is provided between source 23 and the fixed phase 30 of the motor as well as between rotor winding 20 and the source so that the signal due to either the rate gyro or the compass or both appearing in the variable phase 27 of the motor will have the same frequency as the energizing current of the fixed phase 30. Moreover, a conventional phase displacement network (not shown) is included in amplifier 26 for providing substantially a 90° phase shift between the currents of the motor windings as is well known in the art.

It will thus be seen that a novel and desirable orientation system has been provided wherein during straight flight, if the system is used with aircraft, the rate gyro remains in a non-precessing position and the earth inductor device has primary control over the position of heading pointer 47. The system is so designed, however, that any signal developed by the earth inductor is relatively weak as compared to the signal developed because of gyro precession during a turn at an appreciable rate at which time the rate signal controls motor operation.

If no integration errors were present in the system and the inductor remained in a horizontal position, motor operation during turn would actuate pointer 47 as well as displace rotor winding 49 from its null relative to wound stator 50. However, the varying signal from the earth inductor during the turn would provide a moving resultant of the magnetic field at stator 50 so that the electrical axis of rotor 49 would remain substantially normal to the resultant of the stator field and no signal over and above that due to gyro precession would act on variable phase 27 of the motor. Due to integration errors, however, which may add to or subtract from the true angle of pointer motion, rotor winding 49 will be displaced from its null to develop a signal opposing or adding with the signal in variable phase 27 of the motor to correct for integration errors. On the other hand, during a turn, errors are introduced into a pendulously mounted compass which are eliminated by virtue of the fact that during such turn the rate gyro assumes primary control of pointer 47. The gyro and compass are, therefore, mutually corrective and pointer 47 at all times gives a true indication of instantaneous heading.

Instead of operating a heading indicator as shown in Figure 1, the system of the present invention may be applied, as described and claimed in divisional application Serial No. 191,953 filed October 25, 1950, to generating a directional displacement signal for controlling a control surface of a craft having an automatic steering system of the type shown in my copending application Serial No. 516,490, filed December 31, 1943. To this end, therefore, as shown in Figure 2, indicator 47 and scale 48 may be removed and shaft 46 may be coupled to a coaxially aligned shaft 70 through a magnetic clutch 71 and a centralizing device 72. Shaft 70 mounts a rotor winding 73 thereon which is inductively coupled with a three phase wound stator 74 whose windings are energized from source 23. The rotor winding normally assumes a null position relative to stator 74, i. e., one wherein the electrical axis of winding 73 is normal to the resultant of the magnetic field at the stator at which condition no signal exists within winding 73. As soon, however, as shaft 46 is displaced due to the control of either the compass or the rate gyro, rotor winding 73 is angularly displaced from its null whereupon a signal is developed therein which is communicated to the input of a servo amplifier 75 by way of leads 76 and out therefrom by way of leads 77 to energize a servomotor 78 which, through cables 79 will displace a control surface, such as, for example, a rudder 80.

In addition to the directional displacement signal developed by the novel orientation system hereinabove described, it may be desired to superimpose a follow-back signal from motor 78 upon the displacement signal together with a rate signal as more fully shown and described in the last-named copending application. To this end, a follow-back inductive device (not shown) is arranged at motor 78 and connected through leads 81 with the amplifier input while trunnion 13 of the rate gyro is provided with a rotor winding 82 which is inductively coupled with a three phase wound stator 83 connected for energization by source 23. The rotor winding 82 connects by means of leads 84 with the amplifier input to be superimposed upon the displacement and follow-back signals. Alternatively, since a signal is developed at stator 21 of inductive device 22 which is proportional to the rate of turn, stator windings 21 may be connected through leads 85 with the amplifier input instead of the rotor winding 82 in which case the latter winding together with its stator could be eliminated.

As explained more fully in copending application Serial No. 516,490, during manual flight clutch 71 is de-energized so that shafts 46 and 70 are uncoupled. When automatic flight is initiated, clutch 71 is energized so that shafts 46 and 70 are coupled and shaft 70 may be displaced angularly by shaft 46 against centralizing device 72. Upon de-energization of the clutch, the shafts are uncoupled and centralizing device 72 returns rotor winding 73 to its null position relative to stator 74.

There has thus been provided a novel orientation system which may be used as an indicator of heading or which may be used as well as a generator of an accurate directional displacement signal during craft maneuver for operating an automatic steering system.

Although but two embodiments of the invention have been illustrated and described, various changes and modifications in the form and relative arrangement of the parts, which will now appear to those skilled in the art, may be made without departing from the scope of the invention. Reference is, therefore, to be had to the appended claims for a definition of the limits of the invention.

I claim:

1. A rate of turn device for a mobile craft, comprising an induction motor, a two-degree-of-freedom gyroscope having a rotor mounted for spinning about one axis and for precession about a second axis perpendicular to the spin axis, an inductive device, resilient means interconnecting said gyroscope and said device whereby in response to gyro precession during a turn said device is energized to develop a signal proportional to the precession torque developed by said gyroscopic means during said turn for operating said motor, and means comprising a yieldable coupling connecting said motor to said inductive device whereby in response to said signal said motor runs at a speed proportional to the rate of craft turn to produce a precession opposing torque on said gyroscopic means proportional to the rate of craft turn.

2. A rate of turn device for a mobile craft, comprising an induction motor, gyroscopic means mounted for precession in accordance with the turn of said craft, an inductive device having a wound stator and a wound rotor yieldably connected to and actuated by said gyroscopic means for producing a signal in said stator proportional to the precessional torque developed by said gyroscopic means during said turn, means electrically connecting said stator to said motor for operating said motor in response to said signal, and means including a yieldable coupling connecting said motor to the rotor of said inductive device for operating said motor at a speed proportional to the rate of craft turn to produce an opposing force on said gyroscopic means proportional to the rate of craft turn, whereby the precession of said gyroscopic means becomes a function of said rate of turn.

3. A rate of turn device for a mobile craft, comprising an induction motor, gyroscopic means mounted for precession in accordance with the turn of said craft, an inductive device having a wound stator and a wound rotor yieldably connected to and actuated by said gyroscopic means for producing a signal in said stator proportional to the precessional torque developed by said gyroscopic means during said turn, means electrically connecting said stator to said motor for operating said motor in response to said signal, and means comprising an eddy current drag coupling connecting said motor to the rotor of said inductive device for operating said motor at a speed proportional to the rate of craft turn to produce an opposing torque on said gyroscopic means proportional to said rate of craft turn whereby the precession of said gyroscopic means becomes a function of said rate of turn.

4. A rate of turn device for a mobile craft, comprising an induction motor, a two-degree-of-freedom gyroscope having a rotor mounted for spinning about one axis and for precession about a second axis perpendicular to said spin axis, an inductive device having a wound stator and a wound rotor, resilient means interconnecting said gyroscope and the rotor of said inductive device whereby said rotor is actuated to produce a signal in said stator proportional to the precessional torque developed by said gyroscope during said turn, means electrically connecting said stator to said motor for operating said motor in response to said signal, and means comprising a yieldable coupling connecting said motor to the rotor of said inductive device for operating said motor at a speed proportional to the rate of craft turn to produce an opposing torque on said gyroscope proportional to said rate of craft turn, whereby the precession of said gyroscope becomes a function of said rate of turn.

5. Apparatus for use on mobile craft for indicating the heading of said craft, comprising an indicator, gyroscopic means mounted for precession in response to and in accordance with the turn of said craft, an induction motor, an inductive device having a wound stator and a wound rotor mechanically connected to and actuated by said gyroscopic means for developing a signal in said stator proportional to the precessional torque developed by said gyroscopic means during turn, means electrically connecting said stator to said motor for transmitting said signal to said motor for operation thereof, means drivably connecting said motor to the rotor of said inductive device, means comprising a yieldable coupling included in the connection between said motor and the rotor of said inductive device, whereby said motor, upon operation thereof in response to said signal, produces an opposing torque on said gyroscopic means proportional to the rate of turn of the craft and also simultaneously integrates said rate of turn to obtain the amount of turn, and means drivably connecting said motor to said indicator for operating the latter in accordance with said integrated amount of turn.

6. Apparatus for use on mobile craft for indicating the magnetic heading of said craft, comprising an indicator, gyroscopic means mounted for precession in response to and in accordance with the turn of said craft, an induction motor, an inductive device having a wound stator and a wound rotor mechanically connected to and actuated by said gyroscopic means for developing a signal in said stator proportional to the precessional torque developed by said gyroscopic means during turn, means electrically connecting said stator to said motor for transmitting said signal to said motor for operation thereof, means comprising a yieldable coupling included in the connection between said motor and the rotor of said inductive device, whereby said motor, upon operation thereof in response to said signal, produces an opposing torque on said gyroscopic means proportional to the rate of turn of said craft and also simultaneously integrates said rate of turn to obtain the amount of turn, means responsive to the earth's magnetic field connected to and controlling said motor for correcting the integrated amount of turn for an erroneous integrated change of heading, and means drivably connecting said motor to said indicator for operating the latter in accordance with the corrected integrated amount of turn.

7. In combination, a gyroscope mounted for precession in response to the turn of a craft, an electric motor, an inductive device having a wound stator and a wound rotor, means drivably connecting said rotor to said gyroscope for actuation thereby to produce a signal in said stator proportional to the precessional torque developed by said gyroscope during turn, means electrically connecting said stator to said motor for operating said motor in response to said signal, and means including a yieldable coupling drivably connecting said motor to the rotor of said inductive device to produce an opposing torque on said gyroscope proportional to the rate of turn of the craft whereby the precession of said gyroscope becomes a function of said rate of turn.

PAUL A. NOXON.

REFERENCES CITED

The following references are of record in the file of this patent:

UNITED STATES PATENTS

| Number | Name | Date |
| --- | --- | --- |
| 1,831,597 | Henderson | Nov. 10, 1931 |
| 1,900,709 | Henderson | Mar. 7, 1933 |
| 1,924,037 | Henderson | Aug. 22, 1933 |
| 1,966,170 | Greene | July 10, 1934 |
| 1,998,207 | Smith | Apr. 16, 1935 |
| 2,049,120 | Imhof | July 28, 1936 |
| 2,049,375 | Henderson | July 28, 1936 |
| 2,132,677 | Chance | Oct. 11, 1938 |
| 2,242,253 | Lyman | May 20, 1941 |
| 2,274,443 | Fischer | Feb. 24, 1942 |
| 2,361,790 | Noxon | Oct. 31, 1944 |